(12) United States Patent
Sugawara

(10) Patent No.: US 11,550,091 B2
(45) Date of Patent: Jan. 10, 2023

(54) PHASE DIFFERENCE COMPENSATION ELEMENT, LIQUID CRYSTAL DISPLAY DEVICE, AND PROJECTION IMAGE DISPLAY DEVICE

(71) Applicant: DEXERIALS CORPORATION, Tokyo (JP)

(72) Inventor: Junichi Sugawara, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 17/081,192

(22) Filed: Oct. 27, 2020

(65) Prior Publication Data
US 2021/0165150 A1 Jun. 3, 2021

(30) Foreign Application Priority Data
Nov. 28, 2019 (JP) .............................. JP2019-215195

(51) Int. Cl.
*G02B 5/30* (2006.01)
*G02F 1/13363* (2006.01)
*G03B 21/00* (2006.01)

(52) U.S. Cl.
CPC ..... *G02B 5/3083* (2013.01); *G02F 1/133632* (2013.01); *G02F 1/133634* (2013.01); *G03B 21/006* (2013.01); *G02F 2413/02* (2013.01); *G02F 2413/06* (2013.01); *G02F 2413/08* (2013.01); *G02F 2413/10* (2013.01)

(58) Field of Classification Search
CPC ......... G02F 1/133632; G02F 1/133631; G02F 2413/08; G02F 2413/10; G02F 2413/105; G02F 1/133634; G02F 2413/02; G02B 5/285; G02B 1/11; G02B 1/115
See application file for complete search history.

(56) References Cited

U.S. PATENT DOCUMENTS

| | | | |
|---|---|---|---|
| 2005/0264734 A1* | 12/2005 | Robinson | ............ G02F 1/13363 349/119 |
| 2007/0076133 A1 | 4/2007 | Shimizu et al. | |
| 2008/0043158 A1 | 2/2008 | Shirasaka et al. | |
| 2015/0092117 A1* | 4/2015 | Koike | .................. G02F 1/1397 359/489.02 |

FOREIGN PATENT DOCUMENTS

| | | |
|---|---|---|
| JP | 2005172984 A | 6/2005 |
| JP | 2006011298 A | 1/2006 |
| JP | 2009229804 A | 10/2009 |
| JP | 4566275 B2 | 10/2010 |
| JP | 4661510 B2 | 3/2011 |
| WO | 2009001799 A1 | 12/2008 |

\* cited by examiner

*Primary Examiner* — Angela K Davison
(74) *Attorney, Agent, or Firm* — Buchanan, Ingersoll & Rooney PC

(57) ABSTRACT

A phase difference compensation element, including: a transparent substrate; a first optical anisotropic layer that includes an inorganic material, and has a C-plate retardance; and a second optical anisotropic layer that includes an inorganic material, and includes an oblique angle vapor deposition film that does not have an O-plate retardance, wherein the phase difference compensation element including the first optical anisotropic layer and the second optical anisotropic layer in combination has a quasi-O-plate retardance.

12 Claims, 10 Drawing Sheets

PHASE DIFFERENCE COMPENSATION ELEMENT, LIQUID CRYSTAL DISPLAY DEVICE, AND PROJECTION IMAGE DISPLAY DEVICE

CROSS-REFERENCE TO RELATED APPLICATIONS

This application claims priority to Japanese application No. 2019-215195, filed on Nov. 28, 2019 and incorporated herein by reference.

BACKGROUND OF THE INVENTION

Field of the Invention

The present invention relates to a phase difference compensation element, liquid crystal display device, and a projection image display device.

Description of the Related Art

Recently, optical compensation techniques using phase difference compensation elements have been used for improving contrast and view angles of liquid crystal display devices. Example of such techniques include compensation of black level reduction in vertically aligned liquid crystal molecules. Moreover, proposed are an optical compensation method where a phase difference compensation element, such as crystal, is disposed to be parallel to a main plane of a liquid crystal panel to compensate a retardance due to pretilt angles of liquid crystal molecules, or a retardance due to birefringence caused by oblique angle incident light, and a method where an organic material having birefringence, such as a polymer film, is disposed to be parallel to a main plane of a liquid crystal panel to perform optical compensation (see, for example, Japanese Patent Application Laid-Open (JP-A) No. 2005-172984, and Japanese Patent (JP-B) Nos. 4661510 and 4566275).

In a case where a method for processing monocrystal as a phase difference compensation element, in order to perform optical compensation considering particularly pretilt angles of liquid crystal molecules, it is necessary to cut the monocrystal out with a predetermined angle relative to a crystal axis thereof, and extremely high accuracy in cut-out of the material or polishing is important. Therefore, a cost of such a phase difference compensation element is high. Moreover, it is not easy to control a crystal axis in a stretched film.

Therefore, proposed is a method where a phase difference compensation element itself is arranged to be tilted with respect to a main plane of a liquid crystal panel (see, for example, JP-A Nos. 2006-11298 and 2009-229804).

SUMMARY OF THE INVENTION

<1> A phase difference compensation element, including:
a transparent substrate;
a first optical anisotropic layer that includes an inorganic material, and has a C-plate retardance; and
a second optical anisotropic layer that includes an inorganic material, and includes an oblique angle vapor deposition film that does not have an O-plate retardance,
wherein the phase difference compensation element including the first optical anisotropic layer and the second optical anisotropic layer in combination has a quasi-O-plate retardance.

<2> The phase difference compensation element according to <1>,
wherein the first optical anisotropic layer having the C-plate retardance is an optical anisotropic layer that is a birefringent body an optic axis of which is orthogonal to a plane of the transparent substrate,
wherein the O-plate retardance is a tilt angle dependency of a retardance in an optical axial direction of a uniaxial or biaxial birefringent body, an optic axis of which is tilted from a direction orthogonal to the plane of the transparent substrate, where the retardance is 0 at a tilt angle θ which is the tilt angle of the optic axis, and the retardance increases as the tilt angle shifts away from the tilt angle θ within a range of ±45° from the tilt angle θ, and
wherein the quasi-O-plate retardance is a retardance having tilt angle dependency in a direction exhibiting inclined anisotropy, where the minimum value of the retardance is not 0, and the retardance increases as the tilt angle shifts away from a tilt angle φ, at which the retardance becomes the minimum, within a range of ±45° from the tilt angle φ.

<3> The phase difference compensation element according to <1> or <2>,
wherein the second optical anisotropic layer that does not have the O-plate retardance is an optical anisotropic layer that has an optic axis tilted from a direction orthogonal to a plane of the transparent substrate and has a tilt angle dependency of a retardance in an optical axial direction, where a sign + or − of the retardance is reversed depending on the tilt angle.

<4> The phase difference compensation element according to any one of <1> to <3>,
wherein the inorganic material included in the second optical anisotropic layer is an oxide including at least one selected from the group consisting of Si, Nb, Zr, Ti, La, Ta, Al, Hf, and Ce.

<5> The phase difference compensation element according to any one of <1> to <4>,
wherein the first optical anisotropic layer is an antireflection layer, in which two or more inorganic oxide films having mutually different refractive indexes are laminated.

<6> The phase difference compensation element according to any one of <1> to <5>, further including:
a matching layer in which two or more inorganic oxide films having mutually different refractive indexes are laminated, where the matching layer is disposed between the transparent substrate and the second optical anisotropic layer.

<7> The phase difference compensation element according to <5>,
wherein at least one of the inorganic oxide films in the antireflection layer is an oxide film including at least one selected from the group consisting of Ti, Si, Ta, Al, Ce, Zr, Nb, and Hf.

<8> The phase difference compensation element according to <6>,
wherein at least one of the inorganic oxide films in the matching layer is an oxide film including at least one selected from the group consisting of Ti, Si, Ta, Al, Ce, Zr, Nb, and Hf.

<9> The phase difference compensation element according to any one of <1> to <8>, further including:
a protective layer that is a dielectric film, and is disposed on or above the second optical anisotropic layer.

<10> The phase difference compensation element according to any one of <1> to <9>,
wherein the transparent substrate is glass, quartz, crystal, or sapphire.

<11> A liquid crystal display device, including:
a liquid crystal panel; and
a phase difference compensation element,
wherein the phase difference compensation element includes:
a transparent substrate;
a first optical anisotropic layer that includes an inorganic material, and has a C-plate retardance; and
a second optical anisotropic layer that includes an inorganic material, and includes an oblique angle vapor deposition film that does not have an O-plate retardance,
wherein the phase difference compensation element including the first optical anisotropic layer and the second optical anisotropic layer in combination has a quasi-O-plate retardance.

<12> The liquid crystal display device according to <11>, wherein the liquid crystal panel and the phase difference compensation element are disposed in a manner that a main plane of the liquid crystal panel is parallel to a main plane of the phase difference compensation element, or the main plane of the liquid crystal panel is tilted with respect to the main plane of the phase difference compensation element with 2° or less.

<13> A projection image display device, including:
a light source configured to emit light;
a projection optical system configured to project modulated light; and
a liquid crystal display device disposed on an optical path between the light source and the projection optical system, wherein the liquid crystal display element includes a liquid crystal panel and a phase difference compensation element, wherein the phase difference compensation element includes:
a transparent substrate;
a first optical anisotropic layer that includes an inorganic material, and has a C-plate retardance; and
a second optical anisotropic layer that includes an inorganic material, and includes an oblique angle vapor deposition film that does not have an O-plate retardance,
wherein the phase difference compensation element including the first optical anisotropic layer and the second optical anisotropic layer in combination has a quasi-O-plate retardance.

DESCRIPTION OF THE EMBODIMENTS

Embodiments of the present technology will be described in details according to the following order with reference to drawings.
1. Phase difference compensation element
2. Liquid crystal display device
3. Projection image display device
4. Examples The prior art of phase difference compensation elements is as described earlier. However, there is a concern that an internal space of a projector, which has been downsizing, may not be sufficient to arrange a phase difference compensation element to be tilted with respect to a main plane of a liquid crystal panel. Moreover, the phase difference compensation element tends to be deteriorated by heat or light of high brightness and high output, and therefore there is a problem in durability of the phase difference compensation element.

Furthermore, pretilt angles of liquid crystal molecules are not uniform, and therefore there is a need for a phase different compensation element that can correspond to the non-uniform pretilt angles.

Accordingly, there is currently a need for a phase difference compensation element that can significantly reduce a space to be disposed, has excellent durability, and can correspond to non-uniform pretilt angles of liquid crystal molecules.

The present invention aims to solve the above-described various problems existing in the art, and to achieve the following object. Specifically, the present invention has an object to provide a phase difference compensation element, which can significantly reduce a space to be disposed, has excellent durability, and can correspond to varied pretilt angles of liquid crystal molecules, a liquid crystal display device using the phase difference compensation element, and a projection image display device using the liquid crystal display device.

The present invention can solve the above-described various problems existing in the art, and can provide a phase difference compensation element, which can significantly reduce a space to be disposed, has excellent durability, and can correspond to varied pretilt angles of liquid crystal molecules, a liquid crystal display device using the phase difference compensation element, and a projection image display device using the liquid crystal display device.

(Phase Difference Compensation Element)

The phase difference compensation element according to the present embodiment includes a transparent substrate, a first optical anisotropic layer, and a second optical anisotropic layer.

The first optical anisotropic layer functions as a C-plate.

The second optical anisotropic layer does not function as an O-plate.

The second optical anisotropic layer is an oblique angle vapor deposition film.

A retardance of a combination of the first optical anisotropic layer and the second optical anisotropic layer is a quasi-O-plate retardance.

Figure 1:
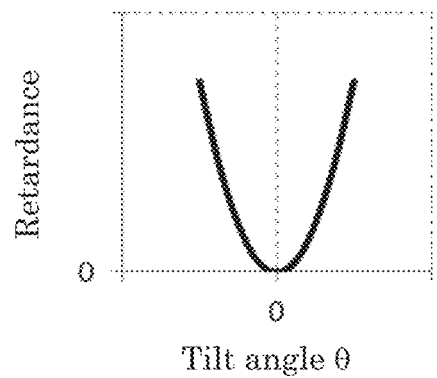
FIG. 1 is a graph depicting a tilt angle dependency of C-plate retardance.

In the present specification, the C-plate is a birefringent body an optic axis of which is orthogonal to a plane of the transparent substrate. The optic axis is a direction along which birefringence does not occur, and a direction with which a phase difference (retardance) is 0. FIG. 1 is a graph depicting a tilt angle dependency of a retardance of a C-plate, and depicting C-plate retardance. The tilt angle of 0° is a direction orthogonal to the plane of the transparent substrate. The retardance is 0 at the tilt angle of 0°, which means the optic axis is orthogonal to the plane of the substrate.

Figure 2:
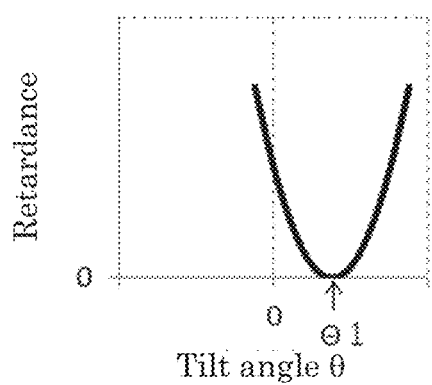
FIG. 2 is a graph depicting a tilt angle dependency of O-plate retardance.

The O-plate is a uniaxial or biaxial birefringent body whose optic axis is tilted from a direction orthogonal to the plane of the transparent substrate. FIG. 2 is a graph depicting a tilt angle dependency of a retardance in an optical axial direction of an O-plate, and depicting O-plate retardance. The retardance is 0 at a tilt angle θ1, which means the optic axis is tilted from a direction orthogonal to the plane of the transparent substrate. In the graph depicting the tilt angle dependency of the retardance in the optic axial direction of the O-plate, specifically, the retardance takes the minimum value at the tilt angle θ1 which is the tilt angle of the optic axis, where the minimum value is 0, and the retardance increases as the tilt angle shifts away from the tilt angle θ1, at which the retardance becomes the minimum, within the range of 45° from the tilt angle θ1 (i.e., the sign + or − of the retardance is not reversed). In the case where a tilt angle dependency of a retardance in an optical axial direction is different from that of the O-plate depicted in FIG. 2, even though the optic axis is tilted from the direction orthogonal to the plane of the transparent substrate, such retardance is not an O-plate retardance. Specifically, it is not an O-plate when the retardance of the optic axis does not take the minimum value at the tile angle θ1 as depicted in FIG. 2, and the sign of the retardance is reversed.

Figure 3:
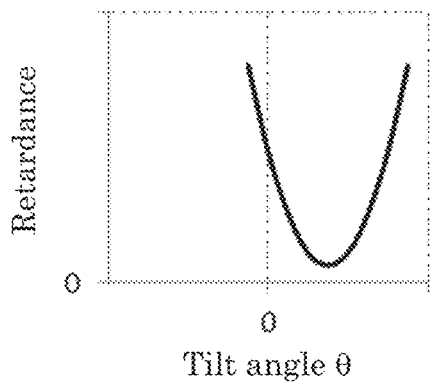
FIG. 3 is a graph depicting a tilt angle dependency of quasi-O-plate retardance.

In the present specification, the term "quasi-O-plate retardance" means a retardance that has a tilt angle dependency in a direction exhibiting inclined anisotropy (a direction equivalent to an optic axis of an O-plate) and has substantially the same tilt angle dependency of the retardance to the O-plate, but the minimum value of the retardance is not 0. FIG. 3 is a graph depicting a tilt angle dependency of a retardance of a quasi-O-plate in a direction exhibiting inclined anisotropy, and depicting a "quasi-O-plate" retardance. In the graph depicting the tilt angle dependency of the retardance of the "quasi-O-plate" in the direction exhibiting inclined anisotropy, specifically, the minimum value of the retardance does not become 0, and the retardance increases as the tilt angle shifts away from the tilt angle θ, at which the retardance becomes the minimum, within a range of ±45°.

Moreover, the phase difference (retardance) can be measured by a retardation measuring device RETS-100, available from Otsuka Electronic Co., Ltd.

Since a retardance obtained by combining the first optical anisotropic layer and the second optical anisotropic is a quasi-O-plate retardance, a residual retardance of a liquid crystal panel can be compensated without tilting the phase difference compensation element relative to the liquid crystal panel. Therefore, a space where the phase difference compensation element is disposed can be significantly reduced. Moreover, a contrast of a liquid crystal panel can be improved because a residual retardance of the liquid crystal panel can be appropriately compensated.

Each of the pretilt liquid crystal molecules functions as an O-plate. In the case where pretilt angles are not uniform, the retardance of the liquid crystal panel is the retardance combining the retardance of the liquid crystal molecules. In this case, the retardance of the liquid crystal panel is a quasi-O-plate retardance, and therefore the phase difference compensation element having the quasi-O-plate retardance can compensate a residual retardance of the liquid crystal panel more appropriately, to thereby improve contrast.

The first optical anisotropic layer includes an inorganic material.

The second optical anisotropic layer includes an inorganic material.

Since the phase difference compensation element includes inorganic materials as constitutional materials, the phase difference compensation element has excellent durability.

Figure 4:
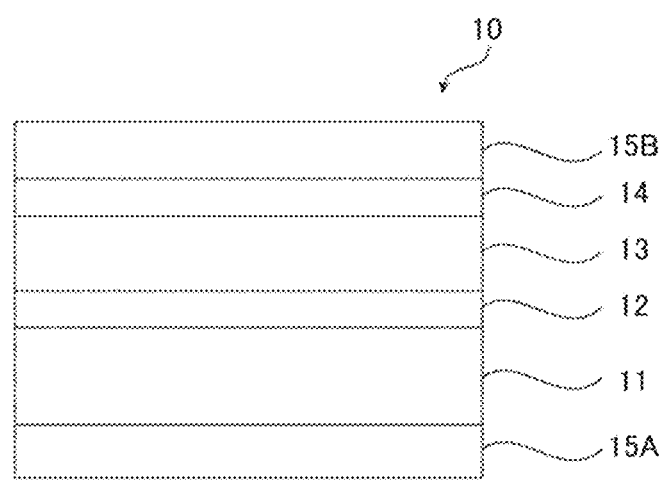
FIG. 4 is a cross-sectional view illustrating a structural example of a phase difference compensation element.

FIG. 4 is a cross-sectional view illustrating a structural example of the phase difference compensation element. As illustrated in FIG. 4, the phase difference compensation element 10 includes a transparent substrate 11, a matching layer 12 disposed on the transparent substrate 11, a second optical anisotropic layer 13 formed of an oblique angle vapor deposition film disposed on the matching layer 12, and a protective layer 14 formed of a dielectric film disposed on the second optical anisotropic layer 13. In the matching layer 12, high refractive index films and low refractive index films are alternately disposed, and a thickness of each film is equal to or less than a wavelength for use. Moreover, a first optical anisotropic layer 15A is disposed at the side of the transparent substrate 11, and the antireflection layer 15B is disposed at the side of the protective layer 14.

<Transparent Substrate>

The transparent substrate 11 is transparent to light of a wavelength range for use. The transparent substrate 11 has a high transmittance to light of a wavelength range for use. For example, a material of the transparent substrate 11 is an inorganic material. Examples of the inorganic material include glass, quartz, crystal, and sapphire. A shape of the transparent substrate 11 is typically a square, but the shape thereof is appropriately selected depending on the intended purpose. For example, a thickness of the transparent substrate 11 is preferably 0.1 mm or greater but 3.0 mm or less.

<First Optical Anisotropic Layer and Antireflection Layer>

For example, the first optical anisotropic layer 15A is disposed to be in contact with a plane of the transparent substrate 11 opposite to the side of the second optical anisotropic layer 13.

The first optical anisotropic layer 15A includes an inorganic material.

The first optical anisotropic layer 15A functions as a C plate.

For example, the antireflection layer 15B is optionally disposed to be in contact with a plane of the protective layer 14 opposite to the side of the second optical anisotropic layer 13.

For example, the first optical anisotropic layer 15A has an antireflection function in a desired wavelength range for use.

For example, the antireflection layer 15B has an antireflection function in a desired wavelength range for use.

Figure 5:
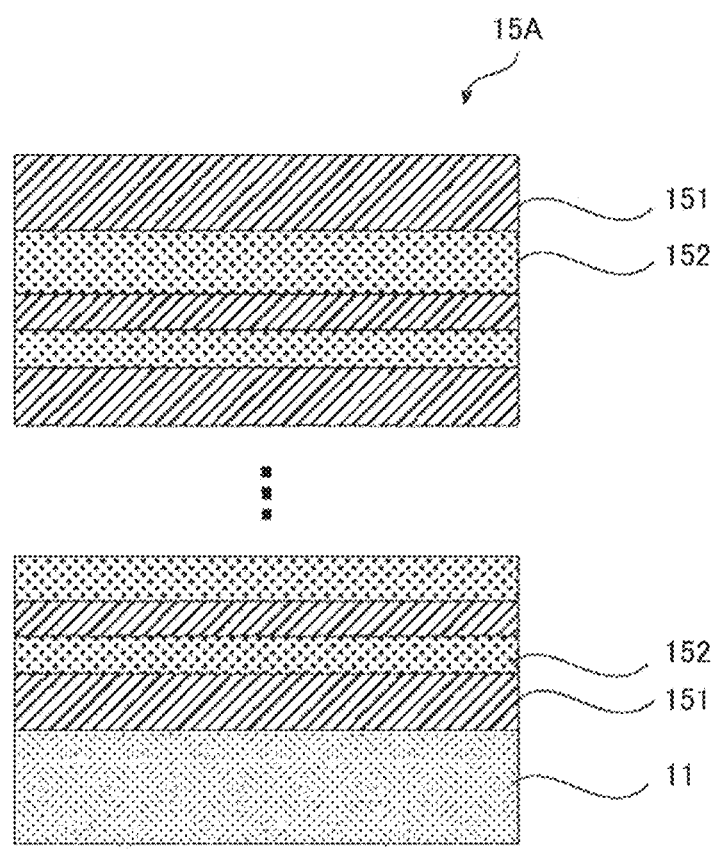
FIG. 5 is a cross-sectional view illustrating an antireflection layer.

FIG. 5 is a schematic cross-sectional view of the first optical anisotropic layer. As illustrated in FIG. 5, the first optical anisotropic layer 15A is an antireflection layer in which two or more inorganic oxide films having mutually different refractive indexes are laminated. For example, the first optical anisotropic layer 15A is a multiple layer, in which first oxide films 151 and second oxide films 152 are alternately laminated, where the first oxide film 151 and the second oxide film 152 have mutually different refractive indexes. The number of layers in the antireflection layer is appropriately determined, and is preferably from about 5 layers to about 40 layers in view of the productivity. Note that, the antireflection layer 15B also has the same structure as the first optical anisotropic layer 15A.

The larger difference between the refractive index of the first oxide film 151 and the refractive index of the second oxide film 152 is more preferable. In view of availability of materials and film formability, the difference is preferably 0.5 or greater but 1.0 or less. The refractive index is, for example, a refractive index at a wavelength of 550 nm.

For example, the inorganic oxide films of the first antireflection layer 15A and the inorganic oxide films of the second antireflection layer 15B are each an oxide film including at least one selected from the group consisting of Ti, Si, Ta, Al, Ce, Zr, Nb, and Hf.

For example, the first optical anisotropic layer 15A and the antireflection layer 15B are each a multiple film where first oxide films 151 formed of niobium oxide (refractive index at wavelength of 550 nm: 2.3) having a relatively high refractive index, and second oxide films 152 formed of silicon oxide (refractive index at wavelength of 550 nm: 1.5) having a relatively low refractive index are alternately laminated.

Note that, the oxides constituting the first optical anisotropic layer 15A or the antireflection layer 15B may be nonstoichiometric. Specifically, an atomic ratio of constitutional elements of the oxide is not necessarily a simple whole number ratio. When an oxide film is formed by sputtering etc., the formed oxide is often nonstoichiometric. Moreover, an elemental ratio of the oxide of the formed film cannot be easily measured stably, thus it is difficult to determine an elemental ratio of the oxide.

Considering the oxide being nonstoichiometric, for example, the oxide including Nb is represented by the following formula.

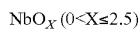

$NbO_X (0 < X \leq 2.5)$

For example, the oxide including Si is represented by the following formula.

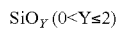

$SiO_Y (0 < Y \leq 2)$

A thickness of the first optical anisotropic layer 15A and a thickness of the antireflection layer 15B are not particularly limited and may be appropriately selected depending on the intended purpose. For example, the thickness thereof is 250 nm or greater but 2,300 nm or less. In the present specification, a thickness of a layer (film thickness) means an average film thickness.

<Matching Layer>

The matching layer 12 is, for example, a multiple layer film where two or more inorganic oxide films having mutually different refractive indexes are laminated. The matching layer 12 is disposed between the transparent substrate 11 and the second optical anisotropic layer 13. The matching layer 12 is designed to cancel interface reflection light by interference, to thereby prevent reflection at an interface between the transparent substrate 11 and the second optical anisotropic layer 13. Specifically, the matching layer 12 is designed to cancel out reflected light at an interface between the transparent substrate 11 and the matching layer 12 and reflected light at an interference between the matching layer 12 and the second optical anisotropic layer 13.

For example, the matching layer 12 is formed of an oxide film including at least one selected from the group consisting of Ti, Si, Ta, Al, Ce, Zr, Nb, and Hf.

Note that, the oxides constituting the matching layer 12 may be nonstoichiometric. Specifically, an atomic ratio of constitutional elements of the oxide is not necessarily a simple whole number ratio. When an oxide film is formed by sputtering etc., the formed oxide is often nonstoichiometric.

A thickness of the matching layer 12 is not particularly limited and may be appropriately selected depending on the intended purpose. For example, the thickness of the matching layer 12 is 140 nm or greater but 240 nm or less.

<Second Optical Anisotropic Layer>

The second optical anisotropic layer 13 includes an inorganic material.

The second optical anisotropic layer 13 includes one or more oblique angle vapor deposition films.

The second optical anisotropic layer 13 does not function as an O-plate.

For example, the second optical anisotropic layer 13 is a birefringent layer obtained by depositing an inorganic material.

An angle formed between the deposition direction of the inorganic material in the birefringent layer and a surface of the transparent substrate is not 90°.

The second optical anisotropic layer 13 does not function as a C-plate.

For example, the second optical anisotropic layer 13 has an optic axis that is tilted from a direction orthogonal to the plane of the substrate, and has a tilt angle dependency of a retardance in the optical axial direction that is different from the tilt angle dependency of an O-plate.

For example, the second optical anisotropic layer 13 has an optic axis that is within ±45° from the direction orthogonal to the plane of the substrate.

In the phase difference compensation element 10 illustrated in FIG. 4, the second optical anisotropic layer 13 is disposed between the matching layer 12 and the protective layer 14.

The birefringent layer includes, for example, a birefringent film formed of an inorganic material. The inorganic material is preferably a dielectric material. Examples of the inorganic material include an oxide including at least one selected from the group consisting of Si, Nb, Zr, Ti, La, Ta, Al, Hf, and Ce.

The inorganic material is preferably tantalum oxide (e.g., $Ta_2O_5$).

A retardance of the birefringent film is not particularly limited and may be appropriately selected depending on a liquid crystal panel for use.

A thickness of the second optical anisotropic layer is appropriately selected depending on a retardance to be compensate. For example, the thickness of the second optical anisotropic layer is 50 nm or greater but 500 nm or less.

Figure 6:
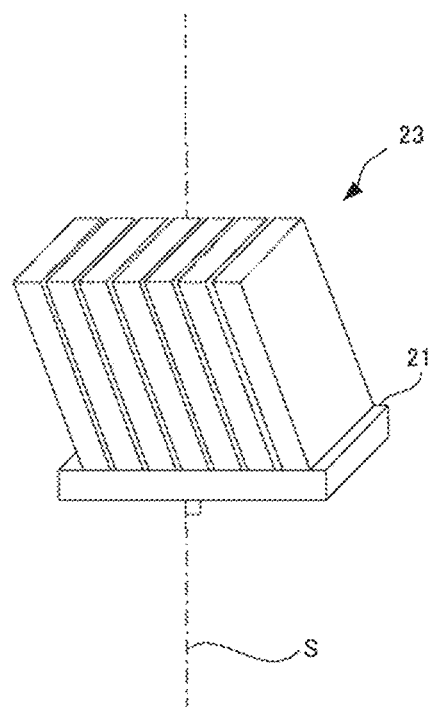
FIG. 6 is a perspective schematic view of an oblique angle vapor deposition film.

FIG. 6 is a perspective schematic view of an oblique angle vapor deposition film. As illustrated in FIG. 6, the oblique angle vapor deposition film 23 constituting the second optical anisotropic layer 13 is formed by depositing a deposition material in a direction slanting relative to a normal line S that is a direction perpendicular to a surface of the transparent substrate 11 or the deposition target surface 21. The slanted angle relative to the normal line S of the deposition target surface 21 is preferably 60° or greater but 80° or less.

For example, the second optical anisotropic layer 13 may have a structure where a plurality of the above-described birefringent films are deposited.

Each birefringent film is formed by depositing in the direction slanting relative to the normal line S, and an angle formed between the film formation direction of an inorganic material constituting the birefringent film and a surface of the transparent substrate is not 90°.

A method creating a state where an angle formed between the film formation direction of the inorganic material and the surface of the transparent substrate is not 90° is, for example, preferably a method where a deposition source is arranged in a position slanted relative to the normal line S and an oblique angle vapor deposition film is formed by oblique angle vapor deposition from the deposition source. When a birefringent layer is formed by performing oblique angle vapor deposition a few times, the oblique angle vapor deposition is repeated with varying the deposition angle to thereby obtain a final birefringent layer.

Figure 7:
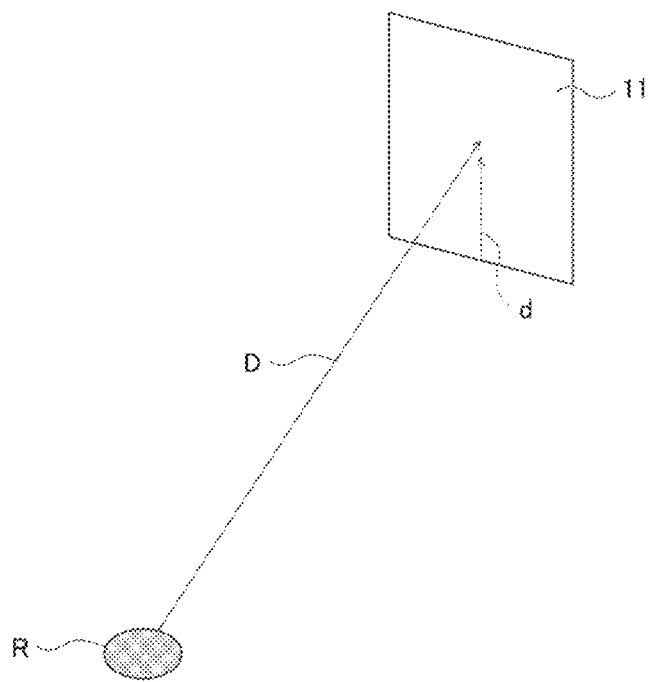
FIG. 7 is a schematic view illustrating one example of an oblique angle vapor deposition for forming an oblique angle vapor deposition film.

FIG. 7 is a schematic view illustrating one example of an oblique angle vapor deposition for forming the oblique angle vapor deposition film.

Figure 8:
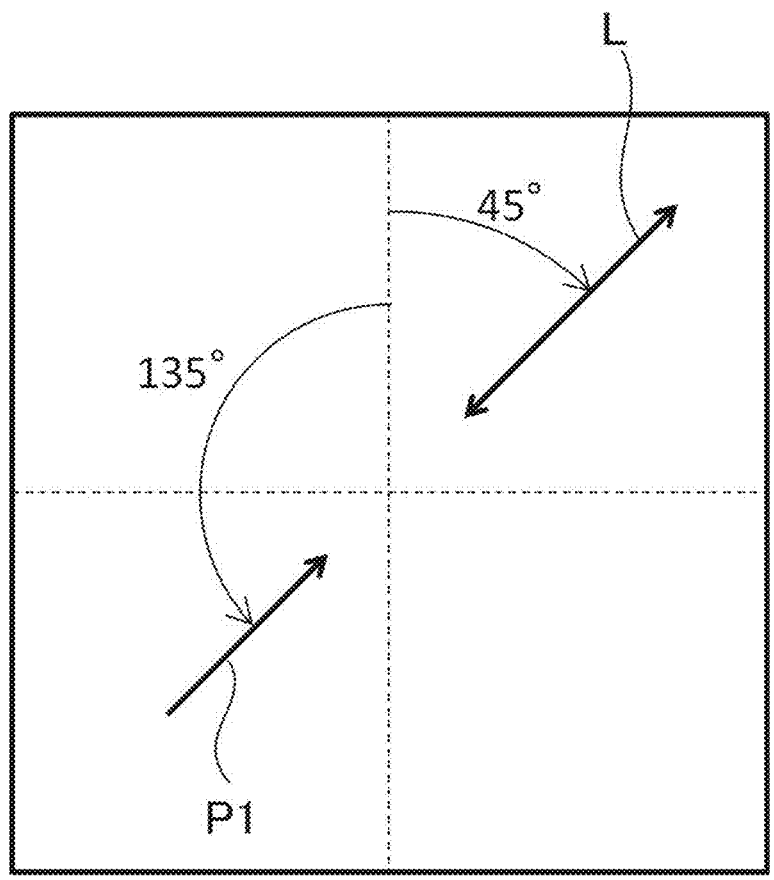
FIG. 8 is a schematic view illustrating one example of a direction in which a deposition direction from a deposition source is projected towards a deposition target surface.

FIG. 8 is a schematic view illustrating one example of a direction (vapor deposition direction) projecting a flying direction of the deposition material from a vapor deposition source to a vapor deposition target surface.

As illustrated in FIG. 7, a linear direction for projecting a film formation direction of the birefringent film on a surface of the transparent substrate is represented by d, when an oblique angle vapor deposition film is formed on the transparent substrate 11 in the deposition direction D from the deposition source R.

During the deposition process P1, as illustrated in FIG. 8, oblique angle deposition is performed from the direction of 135° to form a birefringent film when the anticlockwise direction with a center defined by x and y axis on a deposition surface is determined as +. Note that, the sign L denotes a direction of a line component obtained by projecting a liquid crystal molecule onto a surface of the transparent substrate.

<Protective Layer>

The protective layer 14 is formed of a dielectric film, and is disposed to be in contact with the oblique angle vapor deposition film of the second optical anisotropic layer 13. The presence of the protective layer 14 can prevent warping of the phase difference compensation element 10, and can improve humidity resistance of the oblique angle vapor deposition film.

The dielectric material of the protective layer 14 is not particularly limited and may be appropriately selected depending on the intended purpose, as long as the dielectric material can adjust stress applied to the phase difference compensation element 10, and can exhibit an effect of improving humidity resistance. Examples of such a dielectric material include oxide including at least one selected from the group consisting of Si, Ta, Ti, Al, Nb, and La, and $MgF_2$.

A thickness of the protective layer 14 is not particularly limited and may be appropriately selected depending on the intended purpose. The thickness of the protective layer 14 is, for example, 10 nm or greater but 100 nm or less.

<Production Method of Phase Difference Compensation Element>

Next, a production method of the phase difference compensation element according to the present embodiment will be described.

Figure 9:
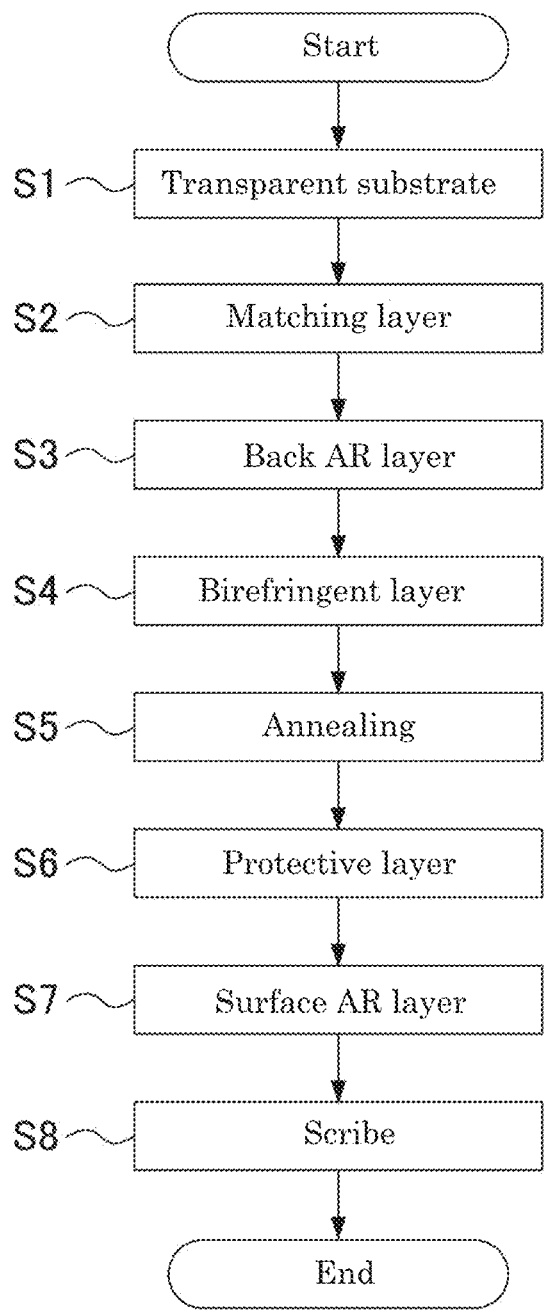
FIG. 9 is a flowchart illustrating a production method of a phase difference compensation element.

As a specific example of the production method of the phase difference compensation element, the production method of the phase difference compensation element having the configuration example illustrated in FIG. 4 will be described hereinafter. FIG. 9 is a flowchart depicting the production method of the phase difference compensation element.

<<S1>>

First, a transparent substrate 11 is provided in Step S1.

<<S2>>

Next, a matching layer 12, in which inorganic oxide films are laminated, is formed on the transparent substrate in order to prevent reflection at an interface between the second optical anisotropic layer 13 and the transparent substrate 11 in Step S2.

<<S3>>

Next, a first optical anisotropic layer 15A [back antireflection (AR) layer] is formed on a surface of the transparent substrate 11, on which the matching layer 12 is not formed, in Step S3.

<<S4>>

Next, a second optical anisotropic layer 13 is formed on the matching layer 12 by oblique angle vapor deposition in Step S4. As illustrated in FIGS. 7 and 8, for example, film formation is performed by a vapor deposition process P1.

<<S5>>

Next, the second optical anisotropic layer 13 is subjected to annealing at a temperature of 200° C. or higher but 600° C. or lower in Step S5. The second optical anisotropic layer 13 is subjected to annealing more preferably at a temperature of 300° C. or higher but 500° C. or lower, further more preferably 400° C. or higher but 500° C. or lower. As a result, properties of the second optical anisotropic layer 13 can be stabilized.

<<S6>>

Next, a protective layer 14 is formed on the second optical anisotropic layer 13 in Step S6. When a film of $SiO_2$ is formed as the protective layer 14, for example, tetraethoxysilane (TEOS) gas and $O_2$ are preferably used as a material of $SiO_2$, and a plasma CVD device is preferably used.

A $SiO_2$ CVD film formed by a plasma CVD device uses a vaporized material gas for film formation different from physical vapor deposition, such as sputtering. Therefore, TEOS gas is relatively easily penetrated into gaps in the column structure to further improve adhesion of the protective layer 14 to the second optical anisotropic layer 13.

<<S7>>

Next, a second antireflection layer 15B (surface AR layer) is formed on the protective layer 14 in Step S7.

<<S8>>

Finally, scribe cutting is performed to obtain a size matched to a specification in Step S8.

According to the production method as described above, an optical element can be obtained.

(Liquid Crystal Display Device)

The liquid crystal display device according to the present embodiment includes a liquid crystal panel and the above-described phase difference compensation element.

For example, the liquid crystal panel and the phase difference compensation element are disposed in the liquid crystal display device in a manner that a main plane of the liquid crystal panel is parallel to a main plane of the phase difference compensation element. Because of the arrangement as described, a space where the phase difference compensation element is disposed can be significantly reduced compared to a case where the phase difference compensation element is disposed to be oblique to the liquid crystal panel. In the present specification, "being parallel to" does not mean complete parallel, and the main plane of the phase difference compensation element may be tilted from the main plane of the liquid crystal panel as long as the space to be arranged can be significantly reduced. For example, the main plane of the phase difference compensation element may be tilted from the main plane of the liquid crystal panel in the range of 2° or less.

The liquid crystal display device includes at least a liquid crystal panel and the phase difference compensation element, and may further include other members, such as a first polarizing plate and a second polarizing plate.

<Liquid Crystal Panel>

The liquid crystal panel is not particularly limited. For example, the liquid crystal panel includes a substrate, and a VA-mode liquid crystal layer including liquid crystal molecules having pretilt relative to the orthogonal direction to the main surface of the substrate, and modulates the entered luminous flux entered. The VA-mode (vertical alignment mode) means a system where liquid crystal molecules aligned vertical (or with pretilt) to the substrate are moved using a longitudinal electric field in a vertical direction.

<<First Polarizing Plate and Second Polarizing Plate>>

A first polarizing plate is a polarizing plate disposed at the inlet side of the liquid crystal panel, and a second polarizing plate is a polarizing plate disposed at the outlet side of the liquid crystal panel. The first polarizing plate and the second polarizing plate are preferably inorganic polarizing plates in view of durability.

Figure 10:
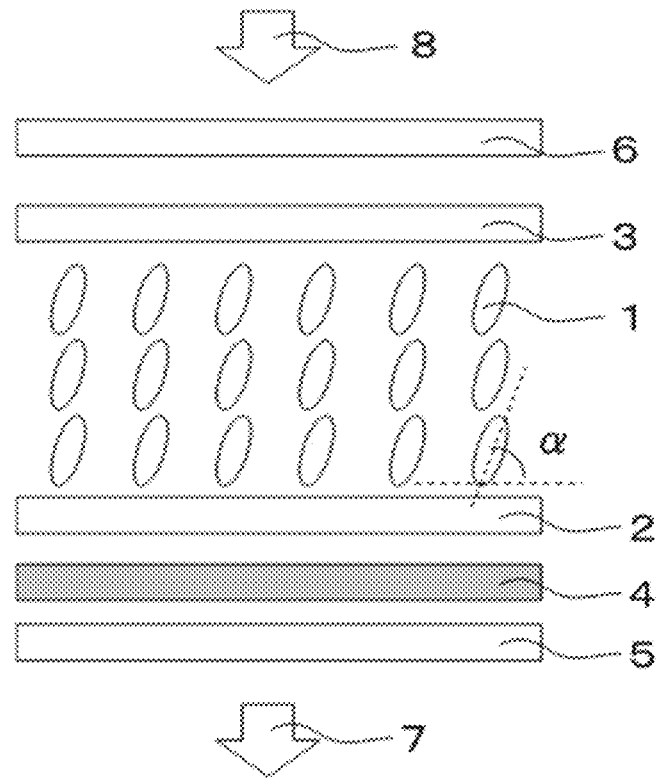
FIG. 10 is a schematic view illustrating one example of a structure of a liquid crystal display device.

A typical optical system will be described with reference to FIG. 10. In case of a vertically aligned transmissive liquid crystal panel, liquid crystal molecules 1 are aligned in a certain direction to be tilted by a pretilt angle α with respect to an orthogonal direction to a plane of the substrate. The liquid crystal panel is disposed to be sandwiched between a pair of polarizing plates arranged in a manner that transmission axes of the polarizing plates are crossed with 90°. Note that, in FIG. 10, the numerical sign 2 denotes a glass substrate, the numerical sign 3 denotes a glass substrate, the numerical sign 4 denotes a phase difference compensation element, the numerical sign 5 denotes a second polarizing plate, the numerical sign 6 denotes a first polarizing plate, the numerical sign 7 denotes emitting light, and the numerical sign 8 denotes incident light.

(Projection Image Display Device)

The projection image display device according to the present embodiment includes a light source configured to emit light, a projection optical system configured to project modulated light, and the above-described liquid crystal display device.

The liquid crystal display device is disposed on an optical path between the light source and the projection optical system.

The projection image display device is suitably used for projectors, such as a liquid crystal projector, and a liquid crystal on silicon (LCOS) projector.

<Light Source>

A light source is not particularly limited and may be appropriately selected depending on the intended purpose, as long as the light source is a member that emits light. For example, a laser light source that emits light of high luminance and high output can be used.

The wavelength of the laser light source is, for example, 455 nm.

<Projection Optical System>

The projection optical system is not particularly limited and may be appropriately selected depending on the intended purpose, as long as the projection optical system is a member for projecting modulated light. Examples of the projection optical system include a projection lens configured to project the modulated light onto a screen.

The projection image display device having the above-described structure can significantly reduce a space where the phase difference compensation element is disposed. Therefore, a small projection image display device can be constructed.

Figure 11:
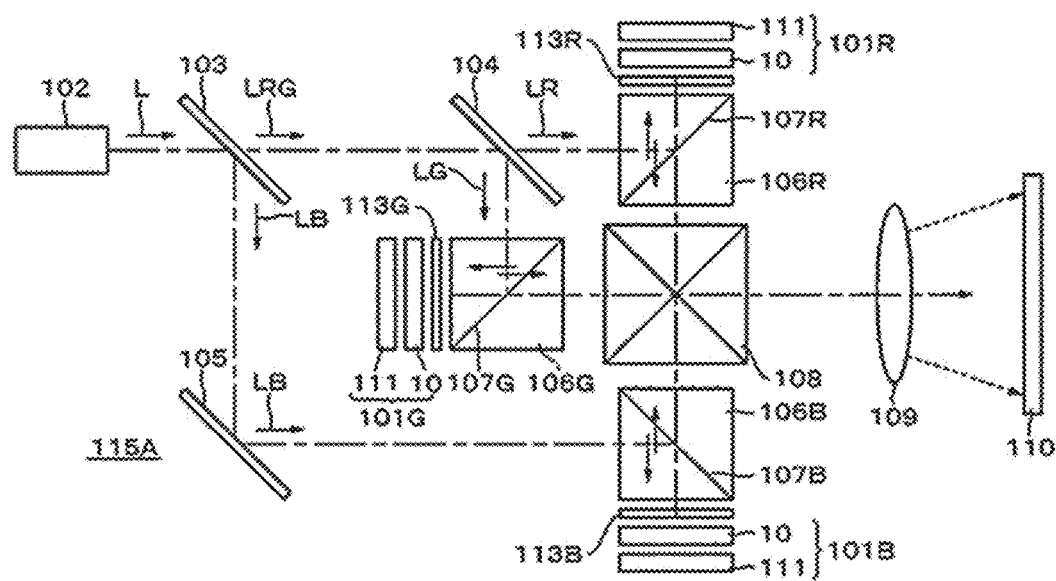
FIG. 11 is a schematic view illustrating one example of a structure of a projection image display device.

FIG. 11 is a schematic view illustrating one example of the structure of the projection image display device according to the present embodiment. The projection image display device 115A is a so-called 3-panel liquid crystal projector, which displays a color image using 3 liquid crystal panels of red, green, and blue. As illustrated in FIG. 11, the projection image display device 115A includes liquid crystal display devices 101R, 101G, and 101B, a light source 102, dichroic mirrors 103 and 104, a total reflection mirror 105, polarization beam splitters 106R, 106G, and 106B, a beam-combining prism 108, and a projection lens 109.

The light source 102 is configured to emit light-source light (white light) L including blue light LB, green light LG, and red light LR for forming an image display. Examples of the light source 102 include a halogen lamp, a metal halide lamp, and a xenon lamp.

The dichroic mirror 103 has a function of separating the light-source light L into blue light LB and light of other colors LRG. The dichroic mirror 104 has a function of separating the light passed LRG through the dichroic mirror 103 into red light LR and green light LG. The total reflection mirror 105 reflects the blue light LB separated by the dichroic mirror 103 towards the polarization beam splitter 106B.

The polarization beam splitters 106R, 106G, and 106B are prism-type polarized light separators disposed on optical paths of the red light LR, the green light LG, and the blue light LB, respectively. The polarization beam splitters 106R, 106G, and 106B have polarized light splitting surfaces 107R, 107G, and 107B, respectively. The polarization beam splitters 106R, 106G, and 106B have a function of splitting the entered light of each color into two polarized light components orthogonal to each other at the polarized light splitting surfaces 107R, 107G, and 107B, respectively. The polarized light splitting surfaces 107R, 107G, and 107B reflect one polarized light component (e.g., an S-polarized light component) and transmit the other polarized light component (e.g., a P-polarized light component).

The color light of the certain polarized light component (e.g., an S-polarized light component) separated by each of the polarized light splitting surfaces 107R, 107G, and 107B of the polarization beam splitters 106R, 106G, and 106B enters each of the liquid crystal display devices 101R, 101G, and 101B. The liquid crystal display devices 101R, 101G, and 101B are driven by driving voltage applied according to an image signal to modulate the incident light, and also have a function of reflecting the modulated light to the polarization beam splitters 106R, 106G, and 106B.

The phase difference compensation elements 10 and the ¼-wave plates 113R, 113G, and 113B are disposed between the polarization beam splitters 106R, 106G, and 106B, and the liquid crystal panels of the liquid crystal display devices 101R, 101G, and 101B, respectively. The ¼-wave plates 113R, 113G, and 113B each function as a ½-wave plate as the ¼-wave plates 113R, 113G, and 113B allow to pass the light twice, i.e., when the light enters the liquid crystal panel, and when the light is emitted from the liquid crystal panel (for example, converting an S-polarized light component into a P-polarized light component). Moreover, the ¼-wave plates 113R, 113G, and 113B have a function of suppressing a reduction of the contrast owing to the incident light angle dependency the polarization beam splitters 106R, 106G, and 106B have. The phase difference compensation elements 10 have a function of compensating the residual retardance of the liquid crystal panels constituting the liquid crystal display devices 101R, 101G, and 101B, respectively. In one aspect, the phase difference compensation element 10 is the phase difference compensation element according to the present embodiment.

The beam-combining prism 108 has a function of combining color light of the certain polarized light components (e.g., P-polarized light components) emitted from the liquid crystal display devices 101R, 101G, and 101B and passed through the polarization beam splitter 106R, 106G, and 106B. The projection lens 109 has a function of projecting the synthesized light emitted from the beam-combining prism 108 towards the screen 110.

Next, an operation of the projection image display device 115A constituted in the above-described manner will be described.

First, white light L emitted from the light source 102 is split into blue light LB and other color light (red light and green light) LRB by a function of the dichroic mirror 103. The blue light LB is reflected to the polarization beam splitter 106B by a function of the total reflection mirror 105.

Meanwhile, other color light (red light and green light) LRG is further split into red light LR and green light LG by a function of the dichroic mirror 104. The split red light LR and green light LG enters the polarization beam splitters 106R and 106G, respectively.

The polarization beam splitters 106R, 106G, and 106B are configured to split the entered color light into two polarized light components orthogonal to each other by the polarized light splitting surfaces 107R, 107G, and 107B, respectively. The polarized light splitting surfaces 107R, 107G, and 107B reflect one polarized light component (e.g., an S-polarized light component) to the liquid crystal display devices 101R, 101G, and 101B. The liquid crystal display devices 101R, 101G, and 101B are driven by driving voltage applied according to an image signal, and modulate color light of the entered certain polarized light by pixel.

The liquid crystal display devices 101R, 101G, and 101B reflect the modulated color light to the polarization beam splitters 106R, 106G, and 106B, respectively. The polarization beam splitters 106R, 106G, and 106B only pass through the certain polarized light component (e.g., P-polarized light components) within the reflected light (modulated light) from the liquid crystal display devices 101R, 101G, and 101B, and emit towards the beam-combining prism 108.

The beam-combining prism 108 synthesize the color light of the certain polarized light components passed through the polarization beam splitters 106R, 106G, and 106B, and emits towards the projection lens 109. The projection lens 109 projects the synthesized light emitted from the beam-combining prism 108 to the screen 110. As a result, an image corresponding to the light modulated by the liquid crystal display devices 101R, 101G, and 101B is projected on the screen 110, and a desired image display is achieved.

EXAMPLES

Specific example of the present invention will be described hereinafter. However, the present invention is not limited to the example below. Note that, formed films are described as a $SiO_2$ film and a $Nb_2O_5$ film for the matter of convenience, but the films are highly likely nonstoichiometric.

Example 1

<Production of Phase Difference Compensation Element>

On one surface of a glass substrate (average thickness: 0.7 mm), $Nb_2O_5$ and $SiO_2$ were alternately deposited by sputtering to form 5 layers in total, to thereby form a matching layer.

On the other surface of the glass substrate, subsequently, $Nb_2O_5$ and $SiO_2$ were alternately deposited by sputtering to form 40 layers, to thereby form a first optical anisotropic layer. The layer structure was designed in a manner that retardance given to tilted incident light that was tilted by 15° from the direction orthogonal to the surface of the glass substrate was 9 nm. As described in Reference Example 1, an optic axis of the obtained first optical anisotropic layer was orthogonal to the plane of the substrate (tilt angle:0°). Specifically, the first optical anisotropic layer functioned as a C-plate.

Subsequently, a deposition source was arranged in a position slanted relative to a normal line of the glass substrate by 70°, and oblique angle vapor deposition was performed using a deposition material prepared by adding $TiO_2$ to $Ta_2O_5$. As illustrated in FIG. 8, the vapor deposition was performed at the deposition direction of 135° to give a film thickness of 80 nm, to thereby form a second optical anisotropic layer. As described in Reference Example 2, an optic axis of the obtained second optical anisotropic layer was tilted from the direction orthogonal to the plane of the glass substrate, a sign of the retardance changed at the tilt angle of 35° and the retardance thereof was clearly different from the tilt angle dependent O-plate retardance. Specifically, the second optical anisotropic layer functioned as neither an O-plate nor a C-plate.

After the vapor deposition, annealing was performed at 400° C. to stabilize the properties of the second optical anisotropic layer. After the annealing, a $SiO_2$ film was formed by plasma CVD using tetraethoxysilane (TEOS) gas and $O_2$.

Subsequently, $Nb_2O_5$ and $SiO_2$ were alternately deposited by sputtering to form 7 layers in total to thereby form an antireflection layer.

As described above, a phase difference compensation element was produced.

Reference Example 1

A first optical anisotropic layer described in Example 1 was produced. Specifically, on one surface of a glass substrate (average thickness: 0.7 mm), $Nb_2O_5$ and $SiO_2$ were alternately deposited by sputtering to form 40 layers in total, to thereby form a first optical anisotropic layer. The layer structure of the first optical anisotropic layer was designed in a manner that a retardance given to oblique incident light tilted by 15° from a direction orthogonal to the surface of the glass substrate was to be 9 nm.

A relationship between a tilt angle and a phase difference (retardance) at a wavelength of 550 nm in the obtained first optical anisotropic layer was determined by means of a retardation measuring device RETS-100, available from Otsuka Electronic Co., Ltd. The result is presented in FIG. 12.

Figure 12:
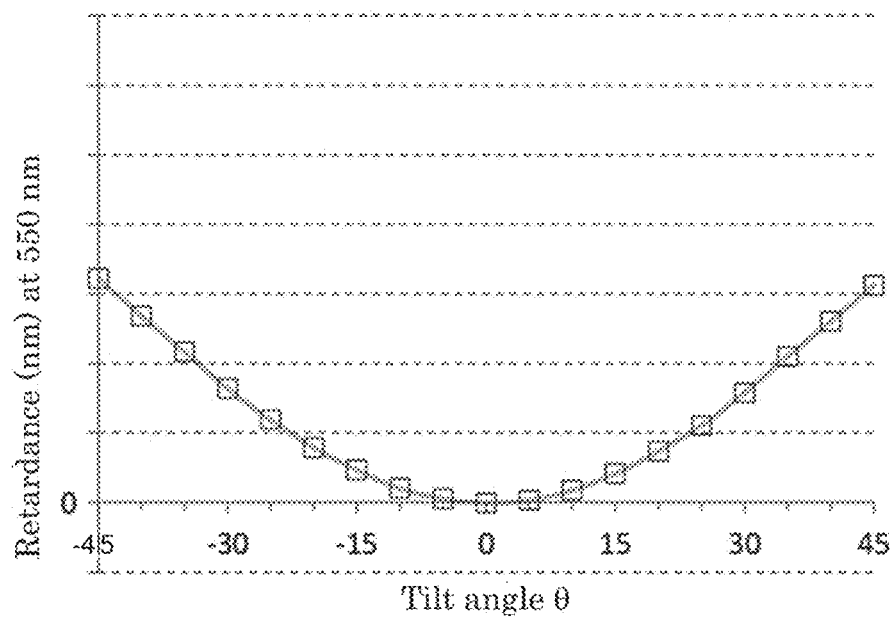
FIG. 12 is a graph depicting a tilt angle dependency of retardance of the first optical anisotropic layer of Example 1.

As depicted in FIG. 12, the first optical anisotropic layer of Example 1 has an optic axis orthogonal to the plane of the substrate (tilt angle:0°). Specifically, the first optical anisotropic layer of Example 1 functions as a C-plate.

Reference Example 2

A second optical anisotropic layer described in Example 1 was produced.

Specifically, on the other surface of the glass substrate (average thickness: 0.7 mm), a deposition source was arranged in a position slanted relative to a normal line of the glass substrate by 70°, and oblique angle vapor deposition was performed using a deposition material prepared by adding TiO$_2$ to Ta$_2$O$_5$. As illustrated in FIG. 8, the vapor deposition was performed at the deposition direction of 135° to give a film thickness of 80 nm, to thereby form a second optical anisotropic layer.

A relationship between a tilt angle and a phase difference (retardance) at a wavelength of 550 nm in the obtained second optical anisotropic layer was determined by means of a retardation measuring device RETS-100, available from Otsuka Electronic Co., Ltd. The result is presented in FIG. 13.

Figure 13:
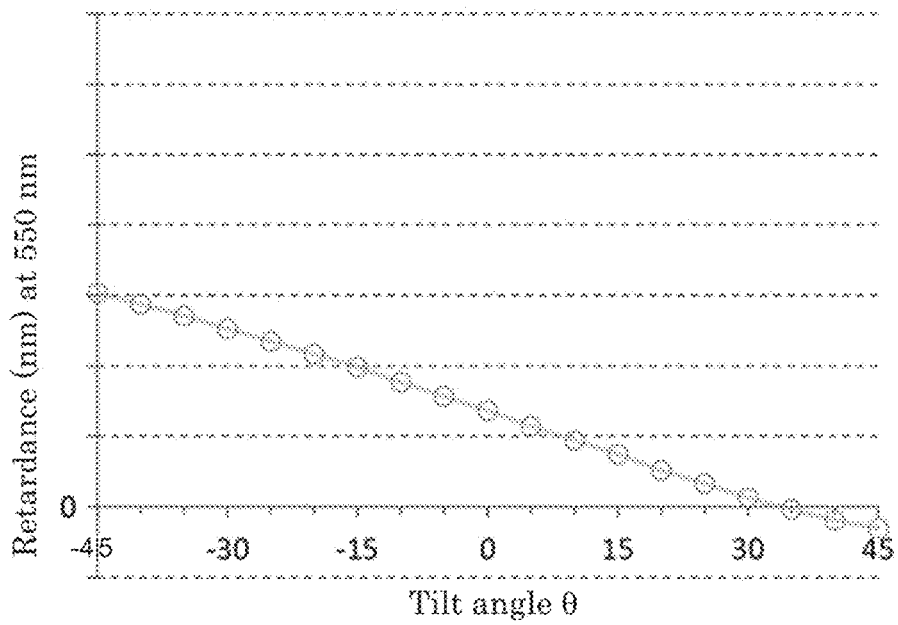
FIG. 13 is a graph depicting a tilt angle dependency of retardance of the second optical anisotropic layer of Example 1.

As depicted in FIG. 13, the optic axis of the second optical anisotropic layer of Example 1 was tilted from the direction orthogonal to the plane of the substrate, but the sign of the retardance was reversed at the tilt angle of 35°, and therefore tilt angle dependency thereof was clearly different from the tilt angle dependency of the O-plate retardance. Specifically, the second optical anisotropic layer of Example 1 did not function as an O-plate. Moreover, the second optical anisotropic layer of Example 1 did not also function as a C-plate.

The sign of the retardance being reversed depending on the tilt angle means a direction of a slow axis rotated by 90° replaced with a fast axis.

Next, a relationship between the tilt angle in the direction exhibiting inclined anisotropy (direction represented by the reference L in FIG. 8) and a phase difference (retardance) at a wavelength 550 nm in the phase difference compensation element including the first optical anisotropic layer and second optical anisotropic layer in combination of Example 1 was determined by means of a retardation measuring device RETS-100, available from Otsuka Electronic Co., Ltd. The result is presented in FIG. 14.

Figure 14:
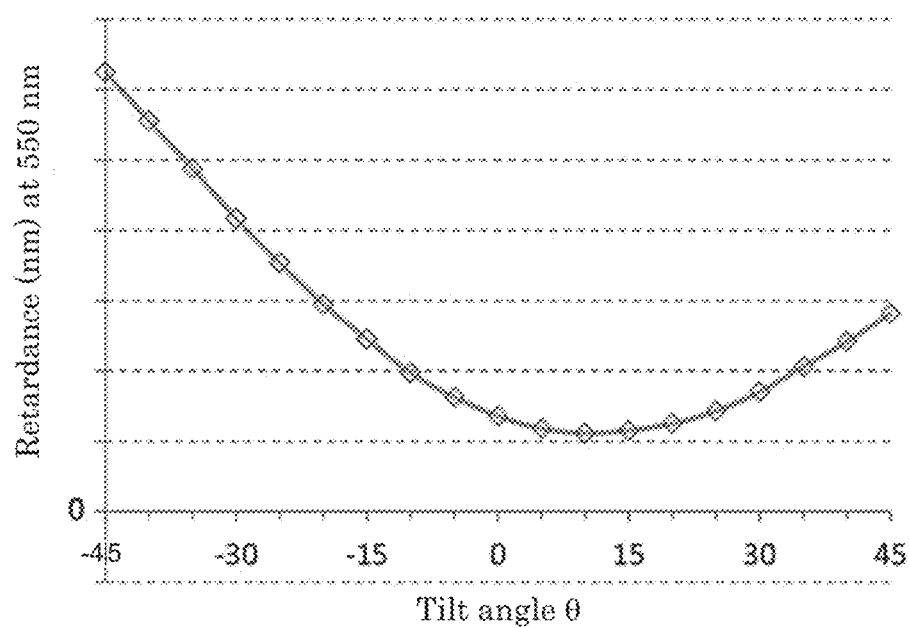
FIG. 14 is a graph depicting a tilt angle dependency of retardance of a combination of the first optical anisotropic layer and second optical anisotropic layer of Example 1.

As illustrated in FIG. 14, the tilt angle of the retardance in the direction exhibiting inclined anisotropy of the phase difference compensation element including the first optical anisotropic layer and second optical anisotropic layer in combination of Example 1 was substantially the same as the tilt angle dependency of the O-plate retardance, but the minimum value of the retardance did not become 0. Specifically, the retardance of the phase difference compensation element including the first optical anisotropic layer and second optical anisotropic layer in combination of Example 1 was a quasi-O-plate retardance.

<Evaluation of Contrast>

The phase difference compensation element of Example 1 was incorporated into a liquid crystal projector, and contrast was measured. The phase difference compensation element was disposed to be parallel to a main plane of the liquid crystal panel. As a result, the average contrast was improved to 625.7, whereas the average contrast of the liquid crystal projector without the phase difference compensation element was 398.8.

The average contrast was an average value of values of contrast measured at arbitral 9 points.

The contrast was measured by means of an illuminometer T-10 available from KONICA MINOLTA, INC.

The phase difference compensation element of the present invention can be suitably applied for a small projection image display device, because the phase difference compensation element can significantly reduce a space to be disposed, and has excellent durability. Moreover, the present invention can provide a phase difference compensation element that can correspond to non-uniform pretilt angles of liquid crystal molecules.

What is claimed is:

1. A phase difference compensation element, comprising:
    a transparent substrate;
    a first optical anisotropic layer that includes an inorganic material, and has a C-plate retardance; and
    a second optical anisotropic layer that includes an inorganic material, and includes an oblique angle vapor deposition film that does not have an O-plate retardance,
    wherein the phase difference compensation element including the first optical anisotropic layer and the second optical anisotropic layer in combination has a quasi-O-plate retardance,
    wherein the quasi-O-plate retardance is a retardance that has a tilt angle dependency in a direction exhibiting inclined anisotropy which is a direction equivalent to an optic axis of an O-plate, and has substantially a same tilt angle dependency of retardance to the O-plate, provided that a minimum value of the retardance is not 0,
    wherein the retardance of the quasi-O-plate increases as a tilt angle of the quasi-O-plate shifts away from a tilt angle φ, in a range of ±45°, wherein the tilt angle φ is an angle at which a value of the retardance of the quasi-O-plate becomes a minimum,
    wherein the second optical anisotropic layer that does not have the O-plate retardance is an optical anisotropic layer that has an optic axis tilted from a direction orthogonal to a plane of the transparent substrate and has a tilt angle dependency of a retardance in an optical axial direction of the second optical anisotropic layer, where a sign + or − of a value of the retardance of the second optical anisotropic layer is reversed at any tilt angle in a range of ±45° from the direction orthogonal to the plane of the transparent substrate.

2. The phase difference compensation element according to claim 1,
    wherein the first optical anisotropic layer having the C-plate retardance is an optical anisotropic layer that is a birefringent body an optic axis of which is orthogonal to a plane of the transparent substrate.

3. The phase difference compensation element according to claim 1,
    wherein the inorganic material included in the second optical anisotropic layer is an oxide including at least one selected from the group consisting of Si, Nb, Zr, Ti, La, Ta, Al, Hf, and Ce.

4. The phase difference compensation element according to claim 1, further comprising:
    a protective layer that is a dielectric film, and is disposed on or above the second optical anisotropic layer.

5. The phase difference compensation element according to claim 1,
    wherein the transparent substrate is glass, quartz, crystal, or sapphire.

6. The phase difference compensation element according to claim 1,
    wherein the first optical anisotropic layer is an antireflection layer, in which two or more inorganic oxide films having mutually different refractive indexes are laminated.

7. The phase difference compensation element according to claim 6,
    wherein at least one of the inorganic oxide films in the antireflection layer is an oxide film including at least one selected from the group consisting of Ti, Si, Ta, Al, Ce, Zr, Nb, and Hf.

8. The phase difference compensation element according to claim 1, further comprising:
    a matching layer in which two or more inorganic oxide films having mutually different refractive indexes are laminated, where the matching layer is disposed between the transparent substrate and the second optical anisotropic layer.

9. The phase difference compensation element according to claim 8,
wherein at least one of the inorganic oxide films in the matching layer is an oxide film including at least one selected from the group consisting of Ti, Si, Ta, Al, Ce, Zr, Nb, and Hf.

10. A liquid crystal display device, comprising:
a liquid crystal panel; and
a phase difference compensation element,
wherein the phase difference compensation element includes:
a transparent substrate;
a first optical anisotropic layer that includes an inorganic material, and has a C-plate retardance; and
a second optical anisotropic layer that includes an inorganic material, and includes an oblique angle vapor deposition film that does not have an O-plate retardance,
wherein the phase difference compensation element including the first optical anisotropic layer and the second optical anisotropic layer in combination has a quasi-O-plate retardance,
wherein the quasi-O-plate retardance is a retardance that has a tilt angle dependency in a direction exhibiting inclined anisotropy which is a direction equivalent to an optic axis of an O-plate, and has substantially a same tilt angle dependency of retardance to the O-plate, provided that a minimum value of the retardance is not 0,
wherein the retardance of the quasi-O-plate increases as a tilt angle of the quasi-O-plate shifts away from a tilt angle φ, in a range of ±45°, wherein the tilt angle φ is an angle at which a value of the retardance of the quasi-O-plate becomes a minimum,
wherein the second optical anisotropic layer that does not have the O-plate retardance is an optical anisotropic layer that has an optic axis tilted from a direction orthogonal to a plane of the transparent substrate and has a tilt angle dependency of a retardance in an optical axial direction of the second optical anisotropic layer, where a sign + or − of a value of the retardance of the second optical anisotropic layer is reversed at any tilt angle in a range of ±45° from the direction orthogonal to the plane of the transparent substrate.

11. The liquid crystal display device according to claim 10,
wherein the liquid crystal panel and the phase difference compensation element are disposed in a manner that a main plane of the liquid crystal panel is parallel to a main plane of the phase difference compensation element, or the main plane of the liquid crystal panel is tilted with respect to the main plane of the phase difference compensation element with 2° or less.

12. A projection image display device, comprising:
a light source configured to emit light;
a projection optical system configured to project modulated light; and
a liquid crystal display device disposed on an optical path between the light source and the projection optical system,
wherein the liquid crystal display element includes a liquid crystal panel and a phase difference compensation element,
wherein the phase difference compensation element includes:
a transparent substrate;
a first optical anisotropic layer that includes an inorganic material, and has a C-plate retardance; and
a second optical anisotropic layer that includes an inorganic material, and includes an oblique angle vapor deposition film that does not have an O-plate retardance,
wherein the phase difference compensation element including the first optical anisotropic layer and the second optical anisotropic layer in combination has a quasi-O-plate retardance,
wherein the quasi-O-plate retardance is a retardance that has a tilt angle dependency in a direction exhibiting inclined anisotropy which is a direction equivalent to an optic axis of an O-plate, and has substantially a same tilt angle dependency of retardance to the O-plate, provided that a minimum value of the retardance is not 0,
wherein the retardance of the quasi-O-plate increases as a tilt angle of the quasi-O-plate shifts away from a tilt angle φ, in a range of ±45°, wherein the tilt angle φ is an angle at which a value of the retardance of the quasi-O-plate becomes a minimum,
wherein the second optical anisotropic layer that does not have the O-plate retardance is an optical anisotropic layer that has an optic axis tilted from a direction orthogonal to a plane of the transparent substrate and has a tilt angle dependency of a retardance in an optical axial direction of the second optical anisotropic layer, where a sign + or − of a value of the retardance of the second optical anisotropic layer is reversed at any tilt angle in a range of ±45° from the direction orthogonal to the plane of the transparent substrate.

* * * * *